United States Patent [19]

Steeve

[11] 4,384,426

[45] May 24, 1983

[54] GEOMETRIC WEEDLESS FISHHOOK ASSEMBLY

[76] Inventor: Edward J. Steeve, 7122 N. Odell, Chicago, Ill. 60631

[21] Appl. No.: 245,101

[22] Filed: Mar. 18, 1981

[51] Int. Cl.³ .............................................. A01K 83/00
[52] U.S. Cl. .................................... 43/43.4; 43/44.82
[58] Field of Search ................... 43/42.4, 42.41, 42.1, 43/43.4, 43.2, 34, 36, 37, 35, 89

[56] References Cited

U.S. PATENT DOCUMENTS

| 454,580 | 6/1891 | Mack | 43/43.2 |
|---|---|---|---|
| 524,494 | 8/1894 | Thayer | 43/42.41 X |
| 699,711 | 5/1902 | Pyott | 43/42.28 |
| 2,124,263 | 7/1938 | Schott | 43/43.2 |
| 3,331,151 | 7/1967 | Turrentine | 43/43.2 |
| 3,727,340 | 4/1973 | Harris | 43/43.2 |
| 4,283,877 | 8/1981 | Onstott et al. | 43/42.4 X |

Primary Examiner—Nicholas P. Godici
Assistant Examiner—Charles L. Willis
Attorney, Agent, or Firm—Emrich, Lee, Brown & Hill

[57] ABSTRACT

A fishhook assembly has the characteristics of being weedless in its unactivated-rest-position by nature of the symmetrical configuration of the three or four identical fishhooks, each point of which is positioned to the outside of the assembly and guarded by an adjacent fishhook. Movement of the fishhook assembly from the unactivated-rest-position to the activated-snagging-position is imparted to the fishhook assembly by the closing of the fish's mouth, forcing the fishhook shanks toward a common central axis and exposing at least one fishhook point for snagging the fish.

12 Claims, 11 Drawing Figures

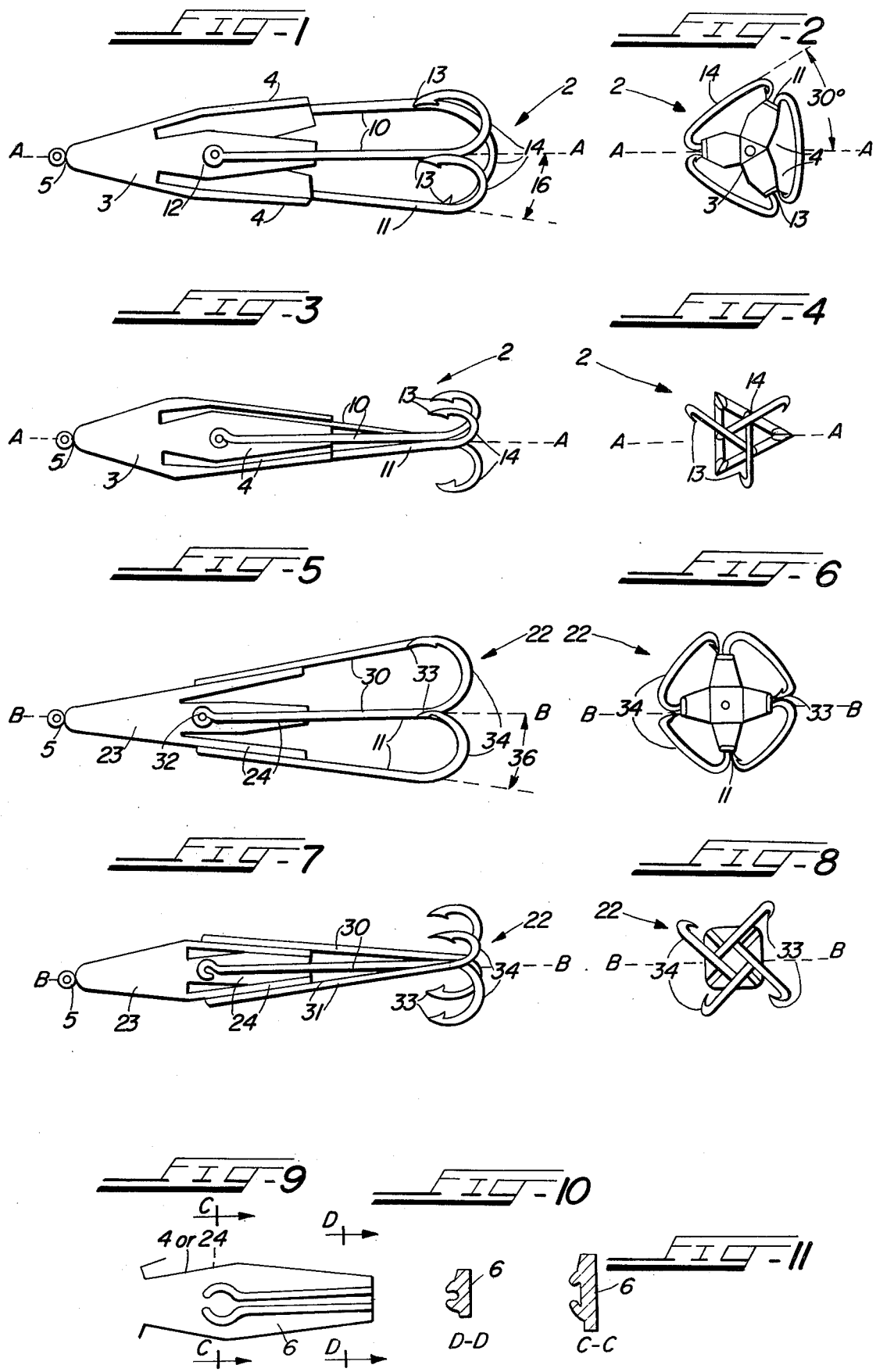

GEOMETRIC WEEDLESS FISHHOOK ASSEMBLY

BACKGROUND OF THE INVENTION

The present invention relates to a multiple gang-type fishhook, the configuration of which has the characteristics of being weedless, having a minimum cross-sectional area in the direction of retrive, and a minimum length for presentation of all fishhooks.

It is a well known fact that fish seek the protection of cover such as weeds, brush, or sunken trees, and that fishing in, or close to, these protective areas produces better catches than fising in open areas. However, fishing with conventional fishhooks results in snagging the weeds or brush. When using conventional weedless type fishhooks the weed protective devices cause the fish to miss being snagged in the mouth by the point of the fishhook. For example, in the case of a single weedless fishhook made weedless by a protective wire or wires positioned above the point, the wire itself is a physical obstacle to the mechanics of snagging the fish, and the plane of the fishhook must be in a near vertical position relative to the open-and-close motion of the fish's mouth.

This disadvantage can be somewhat overcome by the use of a treble fishhook having each of its points protected by wires extending above the points. However, the cross-sectional area of a treble fishhook with protective wires is large and the wires still act as an obstacle to the snagging action.

Fishhook assemblies made weedless by nature of their geometry present an opportunity for improvement and a number of designs have been presented in the past. However, in each of the previous inventions there are shortcomings which have prevented the wide acceptance of the use. For example, in the case of a multiple fishhook assembly having its weedless characteristics by nature of two fishhooks being positioned in the same plane, but facing in opposite directions so their respective points are protected, the fish must close its mouth at a near right angle to the plane of the fishhook assembly to become snagged. This disadvantage is somewhat overcome by positioning a second shorter pair of fishhooks at right angles to the first pair. Examples of these configurations are given in U.S. Pat. Nos. 2,124,263 and 3,727,340. However, the second direction of movement is added at the expense of a second pair of fishhooks which are of a different size than the first pair. Furthermore, the second pair of fishhooks are hidden behind the first pair, adding length to the fishhook assembly and decreasing the effectiveness of snagging a fish.

An example of a weedless multiple fishhook assembly where the fishhooks are not paired, but randomly placed, is illustrated by U.S. Pat. No. 3,331,151. In this weedless fishhook assembly the point of each fishhook is placed in a general inward position to gain its weedless characteristics. The assembly has the disadvantages of requiring each fishhook to be a different size, and carefully hand assembled to avoid interference with each moving fishhook. Also, the different lengths of each fishhook adds to the overall length of the assembly.

SUMMARY OF THE INVENTION

It is one object of the invention to provide a multiple fishhook assembly having three or four fishhooks.

It is another object of the invention to provide a multiple fishhook assembly having its weedless properties by nature of a symmetrical configuration, whereby each fishhook provides the weedless protection for an adjacent fishhook.

It is a further object of the invention to provide a weedless multiple fishhook assembly which in the activated-snagging-position presents at least one exposed point of a fishhook to the fish's mouth no matter what axial or longitudinal position the fish strikes the fishhook assembly.

It is another object of the invention to provide a weedless multiple fishhook assembly which has a minimum overall length and minimum cross-sectional area in its unactivated-rest-position, and to present a larger cross-sectional area in its activated-snagging-position with the points of the fishhooks exposed.

It is still another object of the invention to provide a treble fishhook assembly having weedless properties in its unactivated-rest-position due to its close isosceles triangular configuration, and excellent fish snagging properties in its activated-open-position due to its enlarged triaxial star configuration.

It is still a further object of the invention to provide a weedless multiple fishhook assembly which can be attached to various fishing lures, thus rendering them weedless.

It is still one further object of the invention to provide a multiple weedless fishhook assembly which when immediately preceeded by spinners, feathers, or hair has the appearance of a swimming minnow.

BRIEF DESCRIPTION OF DRAWINGS

FIG. 1 is a side view of the treble fishhook assembly in its unactivated-rest-position.

FIG. 2 is an end view of FIG. 1 observing the same from right to left.

FIG. 3 is a side view of the treble fishhook assembly of FIG. 1 in its fully activated-open position.

FIG. 4 is an end view of FIG. 3 observing the same from right to left.

FIG. 5 is a side view of the quadruple fishhook assembly in its unactivated-rest-position.

FIG. 6 is an end view of FIG. 5 observing the same from right to left.

FIG. 7 is a side view of the quandruple fishhook assembly of FIG. 5 in its fully activated-open position.

FIG. 8 is an end view of FIG. 7 observing the same from right to left.

FIG. 9 is a detail of FIG. 1 or FIG. 5 illustrating one method of fabricating a housing for securely fastening a fishhook within the leaf-spring portion of the mounting stem.

FIG. 10 is an end view of FIG. 9 in section taken on section line D—D.

FIG. 11 is an end view of FIG. 9 in section taken on section line C—C.

DETAILED DESCRIPTION OF THE DRAWINGS

In referring now to the drawings, for purposes of description, McLane's Standard Fishing Encyclopedia, fifth printing, published by Holt, Rinehart and Winston, pages 397–408 are included as reference. Like reference numerals have been used for each embodiment to identify the same or similar parts.

Treble Fishhook Embodiment

In one mode of the present invention illustrated by FIG. 1 through FIG. 4, the weedless fishhook assembly 2 uses three identical fishhooks 10 each of which are fastened to one of the three arms 4 of a mounting stem 3. The mounting stem 3 is fabricated of rubber of a flexible plastic, or of a metal having spring-like properties, and having three arms 4, acting as leaf springs, symmetrically positioned, each forming an acute angle 16 with the axis A—A in the unactivated-rest-position, as illustrated by FIG. 1 and FIG. 2. The arms 4 are formed so that simultaneous movement of the arms 4 toward the axis A—A is unrestricted to the activated-snagging-position, illustrated by FIG. 3 and FIG. 4. A fishing line attaching member 5 having an eye, and a shank which extends into the forward body of the mounting stem 3 along the axis A—A is securely attached thereto. The three fishhooks 10 are firmly secured, one each to the flexible arms 4 of the mounting stem 3. When the mounting stem 3 is molded of rubber or of plastic, a housing for the secure snap fitting of the eye 12 and shank 11 of the fishhooks 10 is molded into the arm 4 as an integral part of the mounting stem 3. The eye 12 and shank 11 of the fishhook 10 are snapped into place and held securely when a force is applied to the fishhook 10 in a direction opposite to that of the force applied by reeling in the fishing line.

When the mounting stem 3 and arms 4 are fabricated of metal the shank 11 of the fishhook 10 can be welded or soldered to the arm 4. It is also possible with fishhooks 10 having shanks 11 with flexible properties to eliminate the arms 4 by securing the eyes 12 to the mounting stem 3 and having the shanks 11 act as the leaf springs as shown in FIG. 12.

A most significant part of the assembly is the positioning of the bend 14 of the fishhook 10 in relation to the longitudinal axis A—A. For the treble fishhook assembly 2, the plane formed by the shank 11 and bend 14 of each of the three fishhooks 10 is at a 30 degree angle with the plane formed by axis A—A and the shank 11 of the fishhook 10. Still another significant part of the assembly 2 is the acute angle 16 formed in the unactivated-rest-position by each arm 4 of the mounting stem 3 and the axis A—A. This acute angle 16 depends on the length and bite of the fishhook 10; therefore, the mounting stem 3 and the arms 4 must be fabricated for the specific size and shape of fishhook 10. Specifically, the arrangement of the mounting stem 3 and the actue angle 16 of 4 must be such that when the fishhooks 10 are fastened to the arms 4, the point 13 of one fishhook 10 is nested to the outside of an adjacent fishhook 10. It is especially significant that the point 13 is nested in a position to the outside of the fishhook assembly 2 in order that the fishhooks 10 not interfere with each other when their shanks 11 are moved toward the axis A—A and the activated-snagging-position. When the treble fishhook assembly 2 is in its rest-position and has the configuration as described above, and illustrated in FIG. 1 and FIG. 2, the shanks 11 of the three fishhooks 10 are free to move toward the axis A—A, and the activated-position. This exposes the three points 13 for snagging the fish as illustrated in FIG. 3 and FIG. 4, and in fact the bends 14 and points 13 create a larger cross-sectional area of snagging exposure, where the fishhooks 10 are, in effect, forced into the mouth of the fish as it closes and the fishing line is reeled in.

It should be noted that because of the symmetrical geometry of the treble fishhook assembly 2 that at least one fishhook point 13, but more probably two points 13, will be exposed in the activated-position as a result of any up-down closing of the fish's mouth. It is; however, not necessary that all three points 13 be exposed in the closing action to snag the fish.

Quadruple Fishhook Embodiment

In a second mode of the present invention, illustrated by FIG. 5 through FIG. 8, the weedless fishhook assembly 22 uses four identical fishhooks 30. It should be noted at this point that most of the description of the construction and operation of the treble fishhook assembly 2 is very similar to that for the weedless fishhook assembly using four fishhooks 22. This is because the same principle of invention is used in each.

The mounting stem 23 is fabricated of a flexible plastic, or of a metal having spring-like properties, such as bronze, and having four arms 24 symmetrically positioned, each forming an acute angle 36 in the unactivated-rest-position with the axis B—B, illustrated by FIG. 5 and FIG. 6. The arms 24 are formed so simutaneous movement of all four arms 24 toward the axis B—B is unrestricted to the activated-snagging-position illustrated by FIG. 7 and FIG. 8. A fishing line attaching member 5, having an eye and a shank which extends into the forward body of the mounting stem 23 along the axis B—B, is securely attached thereto. The four fishhooks 30 are secured, one each, to the flexible arms 24 of the mounting stem 23. Where the mounting stem 23 is molded of plastic, a housing for the secure snap fitting of the eyes 32 and shanks 31 of the fishhooks 30 is molded into the arms 24 as an integral part of the mounting stem 23. The eye 32 and shank 31 of the fishhook 30 are snapped into place and held securely when a force is applied to the fishhook 30 in a direction opposite to that of the force applied by reeling in the fishing line.

When the mounting stem 23 and arms 24 are fabricated of metal the shank 31 of the fishhook 30 can be welded or soldered to the arm 24. It is also possible with fishhooks 30 having shanks 31 with flexible properties to eliminate the arms 24 by securing the eyes 32 to the mounting stem 23 and having the shanks 31 act as the leaf springs.

A most significant part of the assembly is in the positioning of the bend 34 of the fishhook 30 in relation to the longitudinal axis B—B. For the quadrauple fishhook assembly 22, the planes formed by the shank 31 and bend 34 of each of the four fishhooks 30 is at a 45 degree angle with the plane formed by axis B—B and the shank 31 of the fishhook 30. Still another significant part of the assembly is the acute angle 36 formed in the rest position by each arm 24 of the mounting stem 23 and the axis B—B. This acute angle 36 depends on the length and bite of the fishhook 30; therefore the mounting stem 23 and arms 24 must be fabricated for a specific size and shape of fishhook. Specifically, the arrangement of the mounting stem 23 and its arms 24 must be such that when the fishhook 30 is fastened to the arm 24 the point 33 of one fishhook 30 is nested to the outside of an adjacent fishhook 30. It is especially significant that the point 33 is nested in a position to the outside of the fishhook assembly 22 in order to avoid interference with the other fishhooks 30 when the shanks 31 are moved toward the axis B—B and the activated position. When the quadruple fishhook assembly 22 is in its rest position and has the configuration as described above and illustrated in FIG. 5 and FIG. 6 the shanks 31 of the four fishhooks 30 are free to move toward the axis B—B and the activated-position, thus exposing the four points 33 for snagging the fish, as illustrated in FIG. 7 and FIG. 8, and in fact the bends 34 and points 33 create a larger cross-sectional area of snagging exposure where the fishhooks 30 are, ineffect, forced into the mouth of the fish as it closes and the fishing line reeled in.

It should be noted that because of the symmetrical geometry of the quadruple fishhook assembly 22 that at least two of the four fishhook points 33 will be exposed in the activated-position as a result of any up-down closing of the fish's mouth. It is not necessary that all four points 33 be exposed in the closing action to snag the fish.

I claim:

1. A weedless treble fishhook assembly, comprising:
    a. a mounting stem having a forward and rear portion;
    b. a rigid eye securely fastened to the forward end of said mounting stem for the attachment of a fishing line;
    c. three fishhooks, identical in form, each having a point, a bend, and a shank with a forward and rear portion, the shanks of each said fishhook symmetrically placed, equidistant from each other and securely fastened to the said mounting stem, and each of the shanks extending an identical length from the rear of said stem at an identical acute angle to a common longitudinal axis which passes through the center of the forward and rear portions of said mounting stem, and each shank forming a first plane with its respective bend and a second plane with the common longitudinal axis whereby a 30 degree angle is formed between the first plane and second plane in such a manner that the point of each said fishhook is closely nested on the outside of an adjacent said fishhook with only one point nested behind each adjacent said fishhook;
    d. means for resiliently mounting each fishook.

2. A weedless multiple fishhook assembly as recited in claim 1 wherein said mounting stem is molded of plastic.

3. The fishhook assembly as recited in claim 1 wherein said mounting stem is molded of rubber.

4. The fishhook assembly as recited in claim 1 wherein said mounting stem is fabricated of metal.

5. The fishhook assembly as recited in claims 2, 3, or 4 wherein said resilient means is a part of the rear portion of said mounting stem and having the form of three identical leaf springs symmetrically positioned for the secure fastening of the shanks of said fishhooks.

6. The weedless fishhook assembly as recited in claim 5 wherein an eye is formed at the forward end of the shank of each said fishhook, and a housing for the secure snap-fit of the shank and eye of said fishhook is fabricated into the leaf spring portion of each said mounting stem.

7. A weedless multiple fishhook assembly, comprising:
    a. a mounting stem having a forward and rear portion;
    b. a rigid eye securely fastened to the forward end of said mounting stem for the attachment of a fishing line;
    c. four fishhooks, identical in form, each having a point, a bend, and a shank with a forward and rear portion, the shanks of each said fishhook symmetrically placed, equidistant from each other and securely fastened to the said mounting stem, and each of the shanks extending an identical length from the rear of said stem at an identical acute angle to a common longitudinal axis which passes through the center of the forward and rear portions of said mounting stem, and each shank forming a first plane with its respective bend and a second plane with the common longitudinal axis whereby a 45 degree angle is formed between the first plane and second plane in such a manner that the point of each said fishhook is closely nexted on the outside of an adjacent said fishhook with only one point nested behind each adjacent said fishhook;
    d. means for resiliently mounting each fishook.

8. The fishhook assembly as recited in claim 7 wherein said mounting stem is molded of plastic.

9. The fishhook assembly as recited in claim 7 wherein said mounting stem is molded of rubber.

10. The fishhook assembly as recited in claim 7 wherein said mounting is fabricated of metal.

11. The fishhook assembly as recited in claims 8, 9, or 10 wherein said resilient means is a part of the rear portion of said mounting stem and having the form of three identical leaf springs symmetrically positioned for the secure fastening of the shanks of said fishhooks.

12. The fishhook assembly as recited in claim 11 wherein an eye is formed at the forward end of the shank of each said fishhook, and a housing for the secure snap-fit of the shank and eye of said fishhook is fabricated into the leaf spring portion of each said mounting stem.

* * * * *